(12) United States Patent
Kumar

(10) Patent No.: US 11,469,694 B2
(45) Date of Patent: Oct. 11, 2022

(54) POWER DELIVERY SYSTEM AND METHOD

(71) Applicant: GE Global Sourcing LLC, Norwalk, CT (US)

(72) Inventor: Ajith Kuttannair Kumar, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 799 days.

(21) Appl. No.: 16/595,183

(22) Filed: Oct. 7, 2019

(65) Prior Publication Data
US 2021/0104961 A1    Apr. 8, 2021

(51) Int. Cl.
*F02B 37/04*    (2006.01)
*F02B 39/00*    (2006.01)
(Continued)

(52) U.S. Cl.
CPC ............. *H02P 7/343* (2013.01); *B60K 1/00* (2013.01); *B60K 6/24* (2013.01); *B60K 6/26* (2013.01); *B60K 6/28* (2013.01); *B60K 25/08* (2013.01); *B60L 50/10* (2019.02); *B60L 53/20* (2019.02); *F02B 39/00* (2013.01); *H02P 4/00* (2013.01);
(Continued)

(58) Field of Classification Search
CPC ... B60K 1/00; B60K 6/20; B60K 6/24; B60K 6/26; B60K 6/28; B60K 17/354; B60K 17/36; B60K 2001/001; B60L 50/10; B60L 53/20; B60W 10/06; B60W 10/08; B60W 10/30; B60W 20/10; B60Y 2200/92; B60Y 2300/60; B60Y 2400/20; B60Y 2400/11; B60Y 2400/302; B60Y 2400/303; B60Y 2400/306; B60Y 2400/435; B60Y 2400/60; B62D 61/10; F02B 37/04; F02B 39/00; H02P 4/00; H02P 7/343; Y02T 10/62; Y02T 10/70; Y02T 10/7072; Y02T 90/14
See application file for complete search history.

(56) References Cited

U.S. PATENT DOCUMENTS 4,292,531 A * 9/1981 Williamson ............ B60L 50/13
                                            318/158
7,137,253 B2 * 11/2006 Furman .................. F02B 37/10
                                            60/597

(Continued)

*Primary Examiner* — Audrey B. Walter
*Assistant Examiner* — Dapinder Singh
(74) *Attorney, Agent, or Firm* — The Small Patent Law Group LLC; Philip S. Hof

(57) ABSTRACT

A power delivery system includes a first inverter, a second inverter, and a turbocharger assist device. The first inverter is electrically connected to a primary bus and configured to receive electric current from an alternator via the primary bus to supply the electric current to a first load. The alternator generates the electric current based on mechanical energy received from an engine. The second inverter is electrically connected to a secondary bus discrete from the primary bus. The turbocharger assist device is mechanically connected to a turbocharger operably coupled to the engine. The turbocharger assist device is electrically connected to the secondary bus and configured to generate electric current based on rotation of a rotor of the turbocharger. The second inverter is configured to receive the electric current generated by the turbocharger assist device via the secondary bus to supply the electric current to a second load.

20 Claims, 4 Drawing Sheets

(51) Int. Cl.

| | |
|---|---|
| *B60K 6/24* | (2007.10) |
| *B60L 53/20* | (2019.01) |
| *H02P 7/343* | (2016.01) |
| *B60K 6/26* | (2007.10) |
| *B60K 6/28* | (2007.10) |
| *B60K 25/08* | (2006.01) |
| *B60K 1/00* | (2006.01) |
| *B60L 50/10* | (2019.01) |
| *H02P 4/00* | (2006.01) |

(52) U.S. Cl.
CPC ..... *B60K 2001/001* (2013.01); *B60Y 2200/92* (2013.01); *B60Y 2300/60* (2013.01); *B60Y 2400/11* (2013.01); *B60Y 2400/20* (2013.01); *B60Y 2400/302* (2013.01); *B60Y 2400/303* (2013.01); *B60Y 2400/306* (2013.01); *B60Y 2400/435* (2013.01); *B60Y 2400/60* (2013.01); *F02B 37/04* (2013.01)

(56) References Cited

U.S. PATENT DOCUMENTS

| | | | | |
|---|---|---|---|---|
| 7,805,939 | B2 * | 10/2010 | Kimoto | F02B 37/14 60/609 |
| 10,598,085 | B2 * | 3/2020 | Yamashita | H02P 21/18 |
| 10,680,543 | B2 * | 6/2020 | Blackwelder | H02P 9/10 |
| 2016/0257201 | A1 * | 9/2016 | Nikolov | B61C 5/02 |
| 2016/0308455 | A1 | 10/2016 | Ratadiya et al. | |
| 2017/0225635 | A1 * | 8/2017 | Obayashi | F02B 39/10 |
| 2017/0313196 | A1 | 11/2017 | Ratadiya et al. | |

* cited by examiner

POWER DELIVERY SYSTEM AND METHOD

BACKGROUND

Technical Field

The inventive subject matter described herein relates to turbocharged engines.

Discussion of Art

The amount of power produced by a cylinder in an engine depends on a quantity of fuel burned in the cylinder and an amount of air in the cylinder. The power can be increased by providing additional air into the cylinder. Turbochargers are used to increase the amount of air introduced into each cylinder by compressing the air prior to entering the cylinders. Exhaust gas from the engine typically drives the turbocharger by rotating a turbine of the turbocharger. The turbine is connected to a compressor such that the rotating turbine drives rotation of the compressor to increase the pressure of the air directed to the cylinders.

Turbochargers can be difficult to control because the rotating speeds of the turbine and compressor may be based on properties of the exhaust gas from the engine, such as pressure, flow rate, temperature, and the like. Fluctuations in exhaust gas pressure can cause variations in the speed of the turbocharger, which can have detrimental effects. For example, the turbocharger may surge, which can damage the turbocharger machinery. To address surge and other issues, some turbochargers may be fitted with systems to limit turbocharger speed, such as blow off valves, but these systems often result in reduced compressor efficiency. It may be desirable to have a turbocharger-containing power delivery system that differs from the turbocharger control systems that are currently available.

BRIEF DESCRIPTION

In one or more embodiments, a power delivery system is provided that includes a first inverter, a second inverter, and a turbocharger assist device. The first inverter is electrically connected to a primary bus and configured to receive electric current from an alternator via the primary bus to supply the electric current to a first load. The alternator generates the electric current based on mechanical energy received from an engine. The second inverter is electrically connected to a secondary bus that is discrete from the primary bus. The turbocharger assist device is mechanically connected to a turbocharger operably coupled to the engine. The turbocharger assist device is electrically connected to the secondary bus and configured to generate electric current based on rotation of a rotor of the turbocharger. The second inverter is configured to receive the electric current generated by the turbocharger assist device via the secondary bus to supply the electric current to a second load.

In one or more embodiments, a method (e.g., for delivering power) is provided that includes supplying electric current from an alternator to a first inverter via a primary bus of a power delivery system for the first inverter to supply the electric current to a first load. The alternator generates the electric current based on mechanical energy received from an engine. The method also includes supplying electric current from a turbocharger assist device to a second inverter via a secondary bus of the power delivery system for the second inverter to supply the electric current to a second load. The secondary bus is discrete from the primary bus. The turbocharger assist device is mechanically connected to a turbocharger that is operably coupled to the engine. The turbocharger assist device is configured to generate electric current based on rotation of a rotor of the turbocharger.

In one or more embodiments, a vehicle propulsion system is provided that includes an alternator, a turbocharger, a turbocharger assist device, first and second traction motors, a first inverter, and a second inverter. The alternator is configured to generate electric current based on mechanical energy received from an engine. The turbocharger is operably coupled to the engine. The turbocharger assist device is mechanically connected to the turbocharger and configured to generate electric current based on rotation of a rotor of the turbocharger. The first and second traction motors are mechanically connected to first and second wheelsets, respectively. Each of the first and second wheelsets includes at least two wheels. The first traction motor is electrically isolated from the second traction motor. The first inverter is electrically connected to the first traction motor and to the alternator via a primary bus. The first inverter is configured to receive the electric current generated by the alternator to power the first traction motor to rotate the wheels of the first wheelset for propelling movement of the vehicle. The second inverter is electrically connected to the second traction motor and to the turbocharger assist device via a secondary bus. The second inverter is configured to receive the electric current generated by the turbocharger assist device to power the second traction motor to rotate the wheels of the second wheelset for propelling the movement of the vehicle.

BRIEF DESCRIPTION OF THE DRAWINGS

Reference is now made briefly to the accompanying drawings, in which.

DETAILED DESCRIPTION

One or more embodiments described herein provide systems and methods for controlling, supporting, and using a turbocharger that is operably coupled to an engine. For example, the systems and methods described herein include a turbocharger assist device that is mechanically connected to the turbocharger. The turbocharger assist device is an electromechanical device that can be used as a motor and a generator. The turbocharger assist device is electrically connected to a load, and in embodiments of the present disclosure the rotation of one or both of the rotors (e.g., the turbine and compressor) of the turbocharger is used by the turbocharger assist device to generate electric current that is supplied to power the load. At least one technical effect of the systems and methods described herein is energy-efficient operation because the electric current generated by the turbocharger assist device to power the load is based on energy that is salvaged or recycled from engine exhaust gases which rotate the rotors of the turbocharger. In a non-limiting example, the load connected to the turbocharger assist device is a traction motor on a vehicle such that the energy salvaged from the engine exhaust gas is converted to electric current used to power the traction motor to propel the vehicle.

Figure 1:
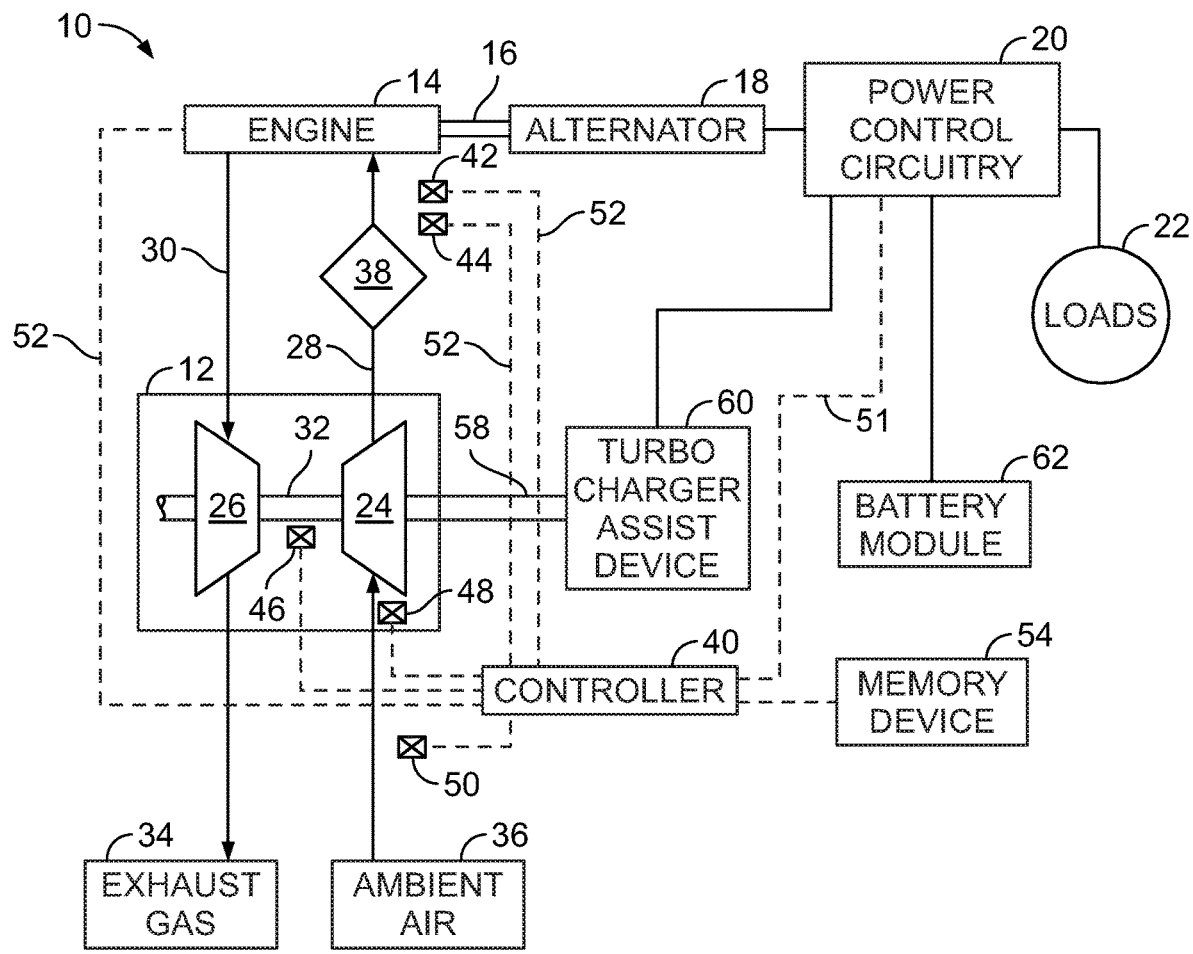
FIG. 1 is a schematic diagram of a turbocharged power system according to an embodiment.

FIG. 1 is a schematic diagram of a turbocharged power system 10 according to an embodiment. The turbocharged power system includes an engine 14 and a turbocharger 12 operably coupled to the engine. The turbocharger is operably coupled to the engine because the exhaust gas from the engine is drives a turbine rotor 26 (referred to herein as turbine) of the turbocharger, which in turn rotates a compressor rotor 24 (referred to herein as compressor) of the turbocharger to compress air that is fed to the engine for combustion with fuel within engine cylinders. The turbocharger is a forced induction device that compresses the air to force an addition amount of air into the cylinders of the engine relative to naturally-aspirated engines. The additional air enables the injection of additional fuel for combustions, so the turbocharger effectively increases the power from each combustion cycle in the cylinder of the engine. In a non-limiting example, the turbocharged power system may be a vehicle propulsion system that is disposed onboard a vehicle and generates tractive force for propelling the vehicle.

The engine has a drive shaft 16 mechanically connected to an alternator or generator 18. Unless otherwise specified, the term "alternator" includes generators and any other device that is configured to convert mechanical energy to electrical energy (e.g., power) through the relative rotation of conductors in a magnetic field, such as a rotor and stator assembly. The alternator generates electrical energy (e.g., electric current) based on the rotation of the drive shaft, and the current is supplied to one or more loads 22. In the non-limiting example in which the turbocharged power system is installed on a vehicle, the one or more loads may include one or more traction motors for propelling the vehicle and/or one or more auxiliary devices, such as fans, air conditioners, lights, power supply devices, compressors, pumps, or the like. The alternator is coupled to power control circuitry 20 which controls the conduction of current to the one or more loads. The power control circuitry may include rectifiers, switches, inverters, converters, capacitors, and/or the like. The power control circuitry is controlled to mediate the source of electric current to the loads at different times, the amount of current supplied to the loads, the direction of current (e.g., to the loads or from the loads), and the like.

The compressor of the turbocharger is operable to provide a supply of compressed air to an intake manifold 28 for combustion in the engine. The turbocharger is mechanically connected, for example, by bolting, to an exhaust manifold 30 of the engine. The turbine of the turbocharger is fluidly coupled to the exhaust manifold such that the exhaust gases 34 of the engine are directed to flow through the turbine. The turbine extracts energy from the exhaust gases of the engine which spins the turbine. The turbine is mechanically connected to the compressor via a turbocharger shaft 32. The rotation of the turbine drives rotation of the compressor via the shaft. The compressor draws ambient air 36 and provides compressed air through an outlet to the intake manifold. The turbocharged power system optionally includes a heat exchanger 38 along the intake manifold that reduces the temperature of the compressed air prior to delivery into the engine. Gases exhausted from the cylinders via the combustion reaction are routed through the exhaust manifold to drive the turbine.

The turbocharged power system includes a turbocharger assist device 60 mechanically connected to the turbocharger. In FIG. 1, the turbocharger assist device is connected to the turbocharger via a turbocharger drive shaft 58. The turbocharger assist device is an electric motor-generator for facilitating independent control of the turbocharger operation. For example, the turbocharger assist device may be a single shaft motor that is driven by rotation of the turbine and/or compressor of the turbocharger via the turbocharger drive shaft. Alternatively, the turbocharger assist device may be a double shaft motor instead of a single shaft. In the illustrated embodiment, the turbocharger assist device is shown at the end of the turbocharger drive shaft, such that the compressor is between the turbine and the turbocharger assist device. In an alternative embodiment, the turbocharger assist device may be disposed between the compressor and the turbine or may be on the other side of the shaft such that the turbine is in the middle.

The turbocharger assist device is operable in two distinct operating modes to supply work to the turbocharger drive shaft (i.e. to apply torque to the shaft for rotation) in a first operating mode and remove work from the turbocharger drive shaft (i.e. to be driven by the shaft to generate electric current) in a second operating mode. The first operating mode is referred to herein as a motor mode because the turbocharger assist device functions as a motor, and the second operating mode is referred to herein as a generator mode because the turbocharger assist device functions as a generator. The turbocharger assist device is electrically connected to the one or more loads via the power control circuitry. For example, in the generator mode, the turbocharger assist device may generate electric current based on the rotation of the turbocharger to supply the electric current to the power control circuitry for powering one or more of the loads, as described in more detail herein.

A battery module 62 is present in the turbocharged power system shown in FIG. 1. The battery module includes one or more battery cells and/or other electrical storage devices. The battery module is electrically connected to the power control circuitry such that the battery module is configured to selectively receive current from the power control circuitry for charging the battery module and to supply current to the power control circuitry for powering one or more devices, such as the loads or the turbocharger assist device. For example, in response to a first operating condition, the power control circuit may direct electric current from the battery module to one or more of the loads, and, in response to a second operating condition, the electric current from the battery module may be directed to the turbocharger assist device operating in the motor mode to drive the turbocharger.

The turbocharged power system includes a controller 40 for controlling the operations of the power system. The controller may be an electronic logic controller including one or more processors and associated circuitry. The controller may operate based on programmed instructions stored in an electronic memory storage device 54 or hard-wired into the logic of the controller. The controller is communicatively connected to multiple sensors 42, 44, 46, 48, 50 that monitor various different parameters of the engine and/or the turbocharger. For example, the sensors may include a pressure sensor 42, a temperature sensor 44, a speed sensor 46, an ambient temperature sensor 48, and a mass flow rate sensor 50. However, various other sensors may be used to monitor different operating parameters of the engine and the turbocharger, such as sensors that are used to monitor current, voltage, power, frequency at the electrical terminals of the turbocharger assist device, angular position of the turbocharger assist device, the battery, the various loads, and/or the like. The controller is configured to receive sensor signals 52 generated by the sensors. The sensor signals include data indicative of the monitored operating parameters. The sensor signals may be communicated to the controller via a wired or wireless communication pathway.

The controller analyzes the received sensor signals and generates control signals 51 in response based on the programmed instructions. The control signals are communicated to the power control circuitry for controlling the distribution of electric current among the loads, the alternator, the battery module, and the turbocharger assist device. For example, the control signals generated by the controller regulate application of work to, or extraction of work from, the turbocharger via the turbocharger assist device. The power control circuitry thereby controls the operation of the turbocharger. The control signals may be communicated to the power control circuitry via a wired or wireless communication pathway. For example, the turbocharged power system optionally may include a wireless communication device operably coupled to the controller. The wireless communication device includes a transceiver or a discrete transmitter and receiver, an antenna, and associated circuitry for transmitting wireless control signals and/or receiving wireless sensor signals.

The controller may implement operating control protocols or schemes for controlling the energy transfer between the turbocharger and the load based on operating parameters (e.g., conditions and/or settings) of the engine, the turbocharger, and/or the like. For example, the turbocharger assist device may be utilized to extract energy from the turbocharger and supply electric current to the load in a first range of operating parameters, and the turbocharger assist device may be blocked from supplying current to the load in a different, second range of operating parameters. In another example, the turbocharger assist device is selectively operable in both a generator mode and a motor mode. In the generator mode, the turbocharger assist device generates electric current based on rotation of the turbocharger to power the load, as described above. In the motor mode, the turbocharger assist device functions as a motor to mechanically assist in rotating the rotors of the turbocharger to compress the air to the engine. For example, the turbocharger assist device receives electrical energy from a battery module, the alternator, and/or the load (e.g., a traction motor) and converts the electrical energy into mechanical energy for spinning the compressor rotor of the turbocharger. The various control protocols described herein may be adjusted or modified based on application-specific considerations and/or parameters. For example, the operating parameters that are monitored, the threshold values and/or ranges of the operating parameters utilized as triggering events, and the actions taken in response to the monitored operating parameters crossing the threshold values and/or ranges may be selectively varied within the scope of the inventive subject matter described herein. The application-specific considerations and/or parameters that may affect the control protocols include environmental conditions, the type of load connected to the turbocharger assist device, commanded operating settings of the engine, and/or the like.

In a non-limiting example control protocol, the turbocharger assist device may be operated in the motor mode during initial start-up of the engine in cold weather conditions. In the motor mode, the turbocharger assist device receives electrical energy supplied via the power control circuitry from one or more of the alternator, the battery module, or the loads. The turbocharger assist device uses the received electrical energy to exert torque on the turbocharger via the turbocharger drive shaft (in addition to torque supplied from the turbine). The additional torque supports rotation of the compressor, permitting compression of additional air and/or at higher pressures for introduction into the cylinders of the engine. Conversely, during high-speed operation in which the engine is warmed up and operating at relatively high engine speeds, the turbocharger assist device may be operated in the generator mode. In the generator mode, the turbocharger assist device extracts work from the turbocharger to generate electric current. The turbocharger assist devices essentially forms an additional load on the turbocharger drive shaft, which decreases the rotational speed of the turbocharger drive shaft and therefore reduces the amount of air and/or the pressure of the air available for introduction into the cylinders of the engine for combustion (relative to the turbocharger operating without the extraction of work by the turbocharger assist device). The electric current generated by the turbocharger assist device is supplied to the power control circuitry for powering one or more of the loads or charging the battery module.

Another benefit of operating the turbocharger assist device in the generator mode is to avoid, or at least reduce the likelihood of, the compressor of the turbocharger experiencing surge or excess speed due to fluctuations in the exhaust gas pressure, flow rate, temperature, and other parameters. By reducing the pressure of compressed air being provided to the engine, the turbocharger assist device reduces the maximum pressures achieved in the cylinders of the engine. Operating the turbocharger assist device in the generator mode reduces the turbocharger speed to maintain the speed below safe design limits while recovering useful energy in the process.

Figure 2:
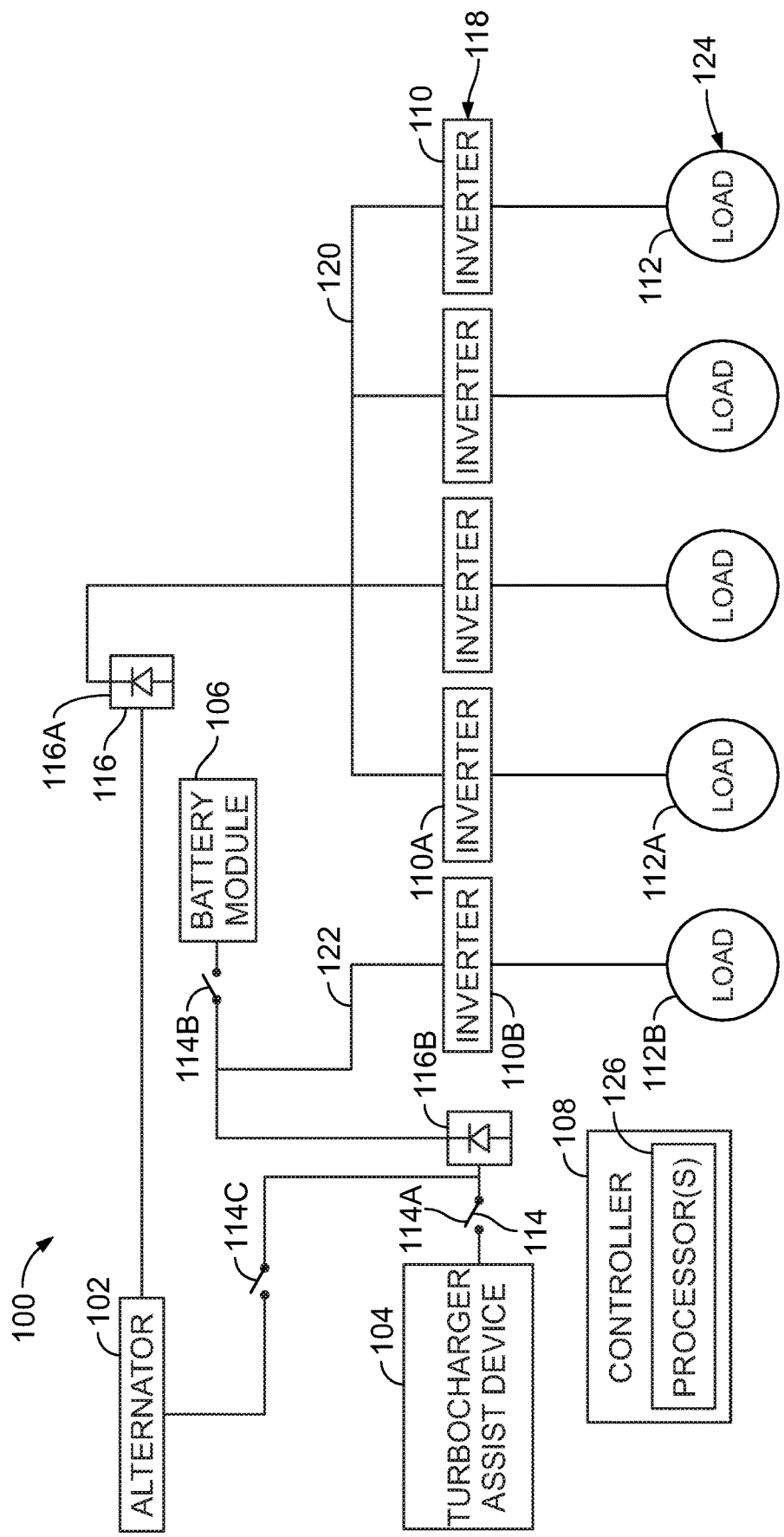
FIG. 2 is a schematic circuit diagram of a power delivery system according to an embodiment.

FIG. 2 is a schematic circuit diagram of a power delivery system 100 according to an embodiment of the present disclosure. The power delivery system 100 includes an alternator 102, a turbocharger assist device 104, a battery module 106, a controller 108, inverters 110, loads 112, switches 114, and rectifiers 116. The power delivery system is configured to distribute electrical energy (e.g., current) among the alternator, the battery module, the turbocharger assist device, and the loads. The power delivery system 100 may represent a portion of the turbocharged power system 10 shown in FIG. 1. For example, the alternator 102 may represent the alternator 18; the turbocharger assist device 104 may represent the turbocharger assist device 60; the battery module 106 may represent the battery module 62; the controller 108 may represent the controller 40; and the loads 112 may represent the loads 22. The inverters 110, switches 114, and rectifiers 116 may represent the power control circuitry 20 shown in FIG. 1.

The inverters of the power delivery system are electronic devices or circuitry that change direct current (DC) to alternating current (AC). Each of the inverters is electrically connected to a corresponding load. In FIG. 2, all of the inverters are electrically connected to different respective loads. Although FIG. 2 discloses inverters, other types of converter devices may be used instead of inverters or in addition to inverters based on application-specific requirements or goals. For example, other types of converter devices may include choppers, H bridges, and the like.

A set 118 of inverters 110 are electrically connected to a primary bus 120. The set 118 includes at least a first inverter 110A. In the illustrated embodiment, the set 118 has four inverters 110 that are commonly connected to the primary bus. The primary bus 120 is an electrically conductive pathway that is used to distribute electric current to the inverters in the set. The primary bus includes or represents one or more bus bars, electrical cables, and/or the like. The primary bus may be rigid or flexible. The alternator is electrically connected to the primary bus via a first rectifier 116A. The rectifiers 116 are electrical devices that convert AC current to DC current. The rectifiers may be three-phase diode rectifiers. The inverters in the set are configured to receive electric current from the alternator 102 via the primary bus. For example, the alternator generates AC current based on mechanical energy (e.g., torque) received from an engine (e.g., the engine 14 shown in FIG. 1). The AC current generated by the alternator is converted to DC current by the first rectifier and is thereafter supplied to the primary bus. The inverters in the set receive the DC current from the primary bus and convert the DC current back to AC current. The AC current is supplied by the inverters in the set to the corresponding loads to power the loads. In the illustrated embodiment, the set of inverters are electrically connected to a set 124 of multiple loads 112. All of the loads in the set are powered by the electric current generated by the alternator 102. In one or more embodiments, only the alternator powers the loads that are in the set connected to the primary bus. For example, neither the battery module nor the turbocharger assist device supplies electric current to the primary bus. A DC bus system is shown for illustration, but the bus system could be an AC bus system.

The power delivery system 100 also includes a secondary bus 122 that is discrete from the primary bus. One of the inverters 110B, referred to herein as a second inverter, is electrically connected to the secondary bus. The second inverter is separate from the inverters in the set and is electrically isolated from the inverters in the set. For example, due at least to the presence of circuit devices such as the rectifiers and the switches, there is no electric current path from the primary bus to the secondary bus or vice-versa. The secondary bus includes or represents one or more bus bars, electrical cables, and/or the like. The second inverter is electrically connected to a corresponding load 112B, referred to herein as a second load. The second load is separate and discrete from the loads in the set 124. The second inverter supplies electric current from the secondary bus to the second load.

The turbocharger assist device 104 is mechanically connected to a turbocharger (e.g., the turbocharger 12 shown in FIG. 1) which is operably coupled to an engine. The turbocharger assist device is electrically connected to the secondary bus. In the generator mode, the turbocharger assist device generates electric current based on rotation of the turbocharger. More specifically, the turbocharger assist device extracts energy from the exhaust gas-driven rotation of the turbine to generate the electric current. The electric current can be directed to the secondary bus where the second inverter supplies the electric current to the second load to power the load. For example, the turbocharger assist device 104 generates AC current, which is converted to DC current by a second rectifier 116B disposed along the secondary bus between the turbocharger assist device and the second inverter. The DC current from the second rectifier is supplied to the second inverter, which converts the DC current back to AC current. The second load is powered by the AC current from the second inverter. The rectifier 116B is shown for illustration. Optionally, instead of the rectifier, a bi-directional converter can be installed and used to power the AC side from the DC side.

The battery module 106 is electrically connected to both the secondary bus and the turbocharger assist device. For example, the battery module is selectively controlled to supply electric current to the secondary bus for powering the second load. When the turbocharger assist device is in the motor mode, the battery module can supply electric current to the turbocharger assist device for powering the turbocharger (e.g., exerting torque to rotate the compressor). Optionally, the turbocharger assist device in the motor mode may receive electric current from the second load instead of, or in addition to, receiving current from the battery module. The battery module may also be selectively charged by the turbocharger assist device when in the generator mode. In this described embodiment in which the turbocharger assist device can be charged by the second load and/or the battery module, the converter 116B may be configured for bidirectional current flow, like an inverter.

The power delivery system includes switches 114 that are operated by the controller 108 to control the distribution of electric current through the power delivery system. The controller is operably coupled to the switches via a wired or wireless communication pathway. The controller includes one or more processors 126 (e.g., microprocessors, integrated circuits, field programmable gate arrays, or the like). For example, the controller generates control signals for actuating the switches. The switches include a first switch 114A associated with the turbocharger assist device. The switches also include a second switch 114B associated with the battery module and a third switch 114C associated with the alternator. The switches are actuatable to establish the conduction of current when in a closed, conducting state, and to block current conduction when in an open, non-conducting state. Each of the switches may represent or include a contactor, an insulated gate bipolar transistor (IGBT), a metal oxide semiconductor field effect transistor (MOSFET), a silicon carbide (SiC) MOSFET, a gallium nitride (GaN) device, a bipolar junction transistor (BJT), a metal oxide semiconductor controlled thyristor (MCTs), a silicon controlled rectifier (SCR), a power diode, a tap, a gat turn-off thyristor, a diode AC switch (DIAC), a triode AC switch (TRIAC), or the like.

The turbocharger assist device is electrically connected to the secondary bus via the first switch. The first switch is selectively closed to permit (e.g. allow or enable) the turbocharger assist device to supply electric current to the secondary bus in the generator mode and receive electric current from the secondary bus in the motor mode. The first switch is selectively opened to disconnect the turbocharger assist device from the secondary bus. The battery module is electrically connected to the secondary bus via the second switch. The alternator is electrically connected to the secondary bus via the third switch. In some embodiments the third switch associated with the alternator may be referred to as a second switch, such as if the power delivery system lacks the battery module. Like the first switch, the second and third switches are selectively closed to permit current flow between the secondary bus and the associated devices (e.g., the battery module and alternator, respectively), and are selectively opened to disconnect the associated devices from the secondary bus. The first, second, and third switches are independently controlled by the controller. The controller may operate the switches based on programmed control protocols (e.g., settings, schemes, etc.) saved within a memory storage device (e.g., the memory device 54 shown in FIG. 1). The control settings may be stored in a database. The controller may select which control setting to implement at a given time based on operating parameters of the engine and/or turbocharger. For example, the memory storage device may include a look-up table that associates operating parameters or conditions with different control settings for controlling the switches.

In one or more embodiments, the secondary bus has a lower voltage than the primary bus. For example, the alternator may supply a greater amount of electrical energy or power to the primary bus than the amount of electrical energy or power supplied by the turbocharger assist device (or the battery module) to the secondary bus. The voltage of the primary bus may be two times or more the voltage on the secondary bus. Due to the variation in power levels, the primary bus is able to power greater loads or a greater number of equivalent loads than the secondary bus. Although the voltage on the secondary bus is low, the secondary bus is efficient because the electric current on the secondary bus may be entirely attributable to the energy salvaged from engine exhaust gases and extracted from the turbocharger. In an embodiment, the inverters in the set may be supplied electric current via the primary bus concurrently with the second inverter being supplied current via the secondary bus. Thus, the first load and the other loads in the set may be concurrently powered with the second load.

The schematic diagram of FIG. 2 illustrates the main components of the power delivery system according to an embodiment. The power delivery system optionally may include additional circuit devices and elements that are not shown in FIG. 2. The power delivery system may include different types of components, different arrangements of components, and/or different numbers of components in alternative embodiments. For example, in one alternative embodiment, the power delivery system may lack the battery module. In another alternative embodiment, there may be greater or less than four inverters connected to the primary bus and/or greater than one inverter connected to the secondary bus. Furthermore, at least some of the inverters may be configured to supply electric current to the same loads instead of each inverter being electrically connected to a different, respective load. In yet another alternative embodiment, the number, type, and/or arrangement of switches and rectifiers may be modified. For example, instead of the first and third switches 114A, 114C, the power delivery system may include a third diode rectifier connected to the second rectifier 116B, which could be controlled to provide the same functionality as the two switches 114A, 114C.

As described in greater detail below, the power delivery system may facilitate retrofit applications. For example, the inverter 110B and load 112B may have been connected to the primary bus 120 previously to receive power from the primary bus 120. A retrofit operation may be performed to achieve the illustrated arrangement with little modification. After the retrofit, the fuel efficiency and/or emissions may be improved relative to the conditions before the retrofit.

Figure 3:
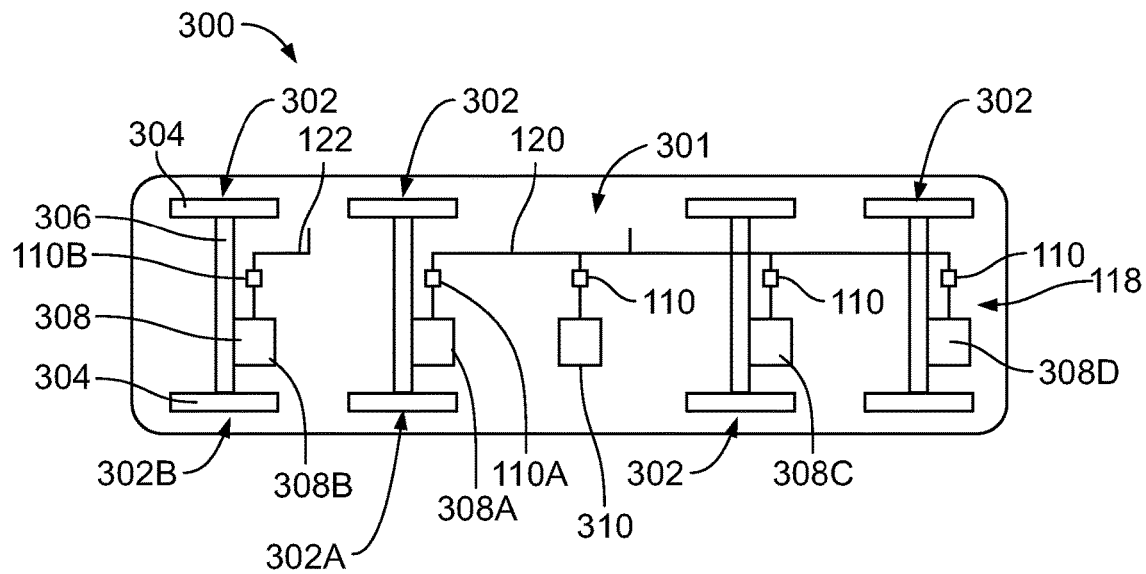
FIG. 3 illustrates a vehicle representing an example application of the power delivery system shown in FIG. 2.

FIG. 3 illustrates a vehicle 300 representing an example application of the power delivery system 100 shown in FIG. 2. The vehicle 300 is a ground-based vehicle that includes multiple wheelsets 302. FIG. 3 is a bottom view of the vehicle showing four wheelsets 302. Each wheelset includes at least two wheels 304 and an axle 306. The wheels are coupled to the axle and spaced apart along the length of the axle. The vehicle includes multiple traction motors 308 mechanically connected to the wheelsets. For example, each traction motor is mechanically connected via a gear set to a corresponding wheelset. The traction motors are used to propel the vehicle along the ground. The traction motors receive electric current and generate torque to rotate the wheelsets for propelling the vehicle. The vehicle in FIG. 3 has four traction motors, and each traction motor is mechanically connected to a different one of the four wheelsets. The vehicle also has an auxiliary motor 310 that is used for powering one or more auxiliary loads onboard the vehicle, such as lights, fans, furnaces, air-conditioners, electronics, and/or the like. The auxiliary motor is not mechanically connected to any of the wheelsets. In a non-limiting example, the vehicle is a rail-based vehicle, such as a locomotive.

The power delivery system 100 shown in FIG. 2 is disposed onboard the vehicle as a portion of a vehicle propulsion system 301 for propelling the vehicle along a route. Although all of the components of the power delivery system may be installed onboard the vehicle, only a subset of the components are illustrated in FIG. 3 for clarity. The first inverter 110A of the power delivery system is electrically connected to a first traction motor 308A of the traction motors, which represents the first load 112A shown in FIG. 2. The second inverter 110B is electrically connected to a second traction motor 308B of the traction motors, which represents the second load 112B shown in FIG. 2. Electric current on the primary bus 120 is supplied by the first inverter to the first traction motor which generates mechanical energy (e.g., torque) to rotate a first wheelset 302A of the vehicle. Electric current on the secondary bus 122 is supplied by the second inverter to the second traction motor which generated mechanical energy to rotate a second wheelset 302B. In one or more embodiments, when the turbocharger assist device 104 (shown in FIG. 2) is operated in the generator mode, the turbocharger assist device 104 supplies electric current to the secondary bus, which powers the second traction motor to rotate the wheels of the second wheelset. Because the electric current generated by the turbocharger assist device 104 is based on the mechanical exhaust gas-driven rotation of the turbine of the turbocharger, energy from the engine exhaust gases is utilized for rotating the second wheelset to propel the vehicle in combination with the current supplied to the primary bus by the alternator.

The third and fourth traction motors 308C, 308D of the vehicle are electrically connected to two other inverters 110 in the set 118 connected to the primary bus. The auxiliary motor 310 is connected to another inverter in the set. As shown in FIG. 3, electrical energy on the primary bus is used to power three of the four traction motors (all but the second traction motor 308B) and the auxiliary motor. Therefore, the alternator supplies electrical energy for powering three traction motors 308A, 308C, 308D, and the turbocharger assist device, based on the rotation of the turbine of the turbocharger, supplies electrical energy for powering the second traction motor 308B. In an embodiment, all four traction motors 308A-308D may be concurrently powered to provide tractive effort for propelling the vehicle. The three traction motors 308A, 308C, 308D connected to the primary bus may each provide a greater amount of tractive effort than the second traction motor 308B connected to the secondary bus because the alternator may supply a greater amount (e.g., voltage) of electrical energy than the turbocharger assist device. In a non-limiting example, the three traction motors 308A, 308C, 308D may each provide 1000 horsepower (HP) at a given tractive setting (e.g., notch setting), and the second traction motor 308B provides 200 HP. Thus, at the given tractive setting, the vehicle is propelled by a combined 3200 HP (1000*3+200).

In an embodiment, the vehicle may be retrofit to accommodate the power delivery system described herein. For example, prior to retrofitting, all four of the traction motors 308A-D may be commonly connected to the primary bus.

Each of the traction motors may be operated to provide 800 HP in order for the vehicle to be propelled by the 3200 HP described in the hypothetical example above. All of the electrical energy for powering the propulsion of the vehicle stems from the electric current generated by the alternator and supplied to the primary bus. The retrofit operation includes electrically isolating one of the traction motors (e.g., the second traction motor 308B) from the primary bus and connecting that traction motor to a secondary bus connected to the turbocharger assist device. The traction motor may be electrically isolated by disconnecting the traction motor from the primary bus. The mechanical connection between that separated traction motor and the associated wheelset may be left intact. The retrofit operation also includes installing the other devices, circuit elements, directional elements, and switching elements of the power delivery system shown in FIG. 2, such as the switches 114A-C, the rectifiers 116A-B, the turbocharger assist device 104 (if not already present on the vehicle), the optional battery module 106, and the like. The retrofit operation may be relatively simple and cost-effective for a mechanic. Optionally, instead of a traction motor, the load 112B could represent an auxiliary device, such as a fan, an air conditioner, a compressor, a power supply, or the like.

Retrofitting vehicles to operably connect a turbocharger assist device to one of the traction motors of the vehicle can significantly increase the efficiency of the vehicle because a portion of the tractive effort propelling the vehicle is generated by salvaging energy from the engine exhaust gases which drive the turbocharger. The alternator coupled to the engine is not relied on for providing all of the tractive effort. When the second traction motor is powered by the electric current generated by the turbocharger assist device to contribute 200 HP, the alternator is only relied on for generating 3000 HP to achieve a net 3200 HP power output. Thus, 6% of the total power output (200/3200=6.25%) is essentially free because it is attributable to energy recycled from the engine exhaust gases.

Furthermore, when the turbocharger assist device is in the motor mode to provide torque for rotating the compressor of the turbocharger, the electric current for powering the turbocharger assist device may be supplied by the second traction motor 308B. For example, the second traction motor may be selectively operated as a generator during regenerative braking. When tractive effort from the second traction motor is not needed, such as when the vehicle is driving along a decline, braking, or the other tractive motors can provide all of the desired tractive effort, the second traction motor can be operated as a generator to generate electric current the rotation of the associated wheelset 302B caused by friction with the ground surface. The electric current generated by the second traction motor can be supplied via the secondary bus to the turbocharger assist device, which functions as a motor to generate mechanical energy (e.g., torque) for rotating the turbocharger. For example, as shown in FIG. 1, the turbocharger assist device may exert torque on the turbocharger drive shaft 58 which increases the rotational speed of the compressor 24. Increasing the compressor speed increases the amount and/or pressure of the air fed to the cylinders of the engine, which can increase the power output of the engine. Thus, the rotation of the wheels and axle of one of the wheelsets can be used to power the turbocharger.

To regulate the temperature of the turbocharger assist device, the turbocharger assist device can be installed on the vehicle in a location that receives cooling airflow. The presence of the diode rectifiers 116 enable spacing the turbocharger assist device a significant distance (e.g., one to five meters) away from the inverter 110B and traction motor 308B. In a non-limiting example, the turbocharger assist device can be installed within or adjacent to an air plenum that conveys cooling air. The cooling air through the plenum dissipates heat from the turbocharger assist device during operation.

In alternative embodiments, the vehicle may have other than four traction motors, more than one auxiliary motor, and/or other than four wheelsets. For example, the vehicle may be a locomotive that has six wheelsets and six traction motors. The locomotive may be retrofit by disconnecting one of the six traction motors from the primary bus such that the turbocharger assist device powers one traction motor and the alternator powers the other five. Although the vehicle is described as a locomotive, the power delivery system described herein may be installed within the propulsion systems of various other types of vehicles containing turbocharged engines, such as automobiles, trucks, mining equipment, aircrafts, marine vessels, and the like. Furthermore, FIG. 3 represents a vehicular application of the power delivery system, but the power delivery system can be used in various non-vehicle applications. Some non-limiting examples of non-vehicle applications include stationary engine drive systems (e.g., generator sets) and other industrial electric machinery.

Figure 4:
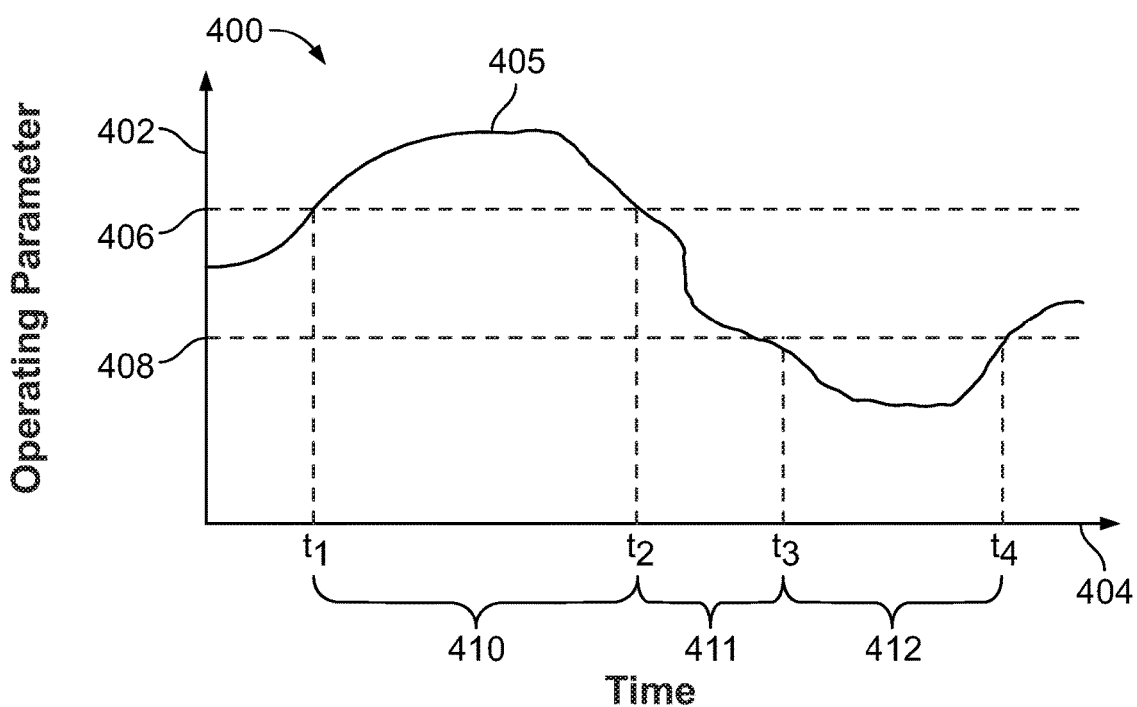
FIG. 4 is a graph depicting a control protocol for controlling a supply of electric current to a load according to an embodiment.

FIG. 4 is a graph 400 depicting a control protocol for controlling a supply of electric current to a load according to an embodiment. The graph plots an operating parameter along the vertical axis 402 and time along the horizontal axis 404. A trendline 405 displays the value of the operating parameter over time. The control protocol may be implemented by the one or more processors 126 of the controller 108 of the power delivery system 100 shown in FIG. 2. The one or more processors may perform the control protocol based on programmed instructions stored in a memory device or hard-wired into the logic of the controller. The operating parameter represents an operating parameter of a turbocharged engine, such as a parameter associated with operation of the engine or the turbocharger. Some non-limiting examples of the operating parameter include a compressor pressure ratio of the turbocharger, rotational speed of the turbocharger, intake manifold temperature, intake manifold pressure, mass flow rate of air entering the engine, exhaust manifold temperature, exhaust manifold pressure, mass flow rate of exhaust gas exiting the engine, or the like. The one or more processors are configured to monitor the operating parameter over time based on received sensor signals. The sensor signals are generated by sensors installed on or proximate to the engine and the turbocharger, such as the sensors 42, 44, 46, 48, 50 shown in FIG. 1.

In an embodiment, the protocol defines a first designated threshold 406 and a second designated threshold 408 for the operating parameter. The first designated threshold is greater than the second designated threshold. The values of the first and second designated thresholds may be selected based on application-specific and parameter-specific considerations. As shown by the trendline 405, the monitored operating parameter exceeds the first designated threshold at time $t_1$. In response, the one or more processors are configured to allow the turbocharger assist device 104 to supply electric current to the second inverter 110B via the secondary bus 122 to power the second load 112B. For example, the one or more processors may generate a control signal that is transmitted to the first switch 114A to close the first switch, establishing a conductive path between the turbocharger assist device and the second load. Optionally, the second and third switches 114B, 114C at time $t_1$ are controlled to be open and non-conducting such that the second inverter only receives the electric current supplied by the turbocharger assist device. The turbocharger assist device supplies current to the secondary bus during a first time period 410 until the operating parameter falls below the first designated threshold at time $t_2$. At time $t_2$, the one or more processors may open the first switch to break the conductive pathway and block the turbocharger assist device from supplying current to the secondary bus.

Optionally, no current is supplied to the secondary bus for powering the second load during a second time period 411 from time $t_2$ until the operating parameter falls below the second designated threshold at time $t_3$. The second load may not be powered during the second time period. At time $t_3$, the one or more processors may be configured to close the second switch 114B, close the third switch 114C, or close both the second and third switches. In one example, the processors close the second switch 114B only to allow the battery module 106 to supply electric current to the secondary bus for powering the second load 112B. The battery module 106 supplies current to the secondary bus during a third time period 412 from time $t_3$ until the operating parameter exceeds the second designated threshold at time $t_4$. If the battery module is not charged or not present, then at time $t_3$ the processors may close the third switch 114C to allow the alternator 102 to supply electric current to the secondary bus for powering the second load during the third time period.

The example control protocol graphed in FIG. 4 indicates that the source of electric current on the secondary bus 122 for powering the second load 112B may change over time based on the monitored operating parameter. For example, the second load is powered by the turbocharger assist device 104 during the first time period 410, is not powered at all during the second time period 411, and is powered by the battery module 106 and/or the alternator 102 during the third time period 412. The turbocharger assist device powers the second load when the operating parameter is greater than the first designated threshold because at this high parameter range, the engine does not require much work from the turbocharger to compress the incoming air, so some of the energy can be extracted to power the second load. The turbocharger assist device is not used to power the second load when the operating parameter is less than the first designated threshold so that energy is not extracted from the turbocharger to power the load. For example, the engine may operate more efficiently at lower parameter levels when all of the energy salvaged from the engine exhaust gases is utilized by the turbocharger for compressing the incoming air.

Optionally, the protocol may define a third designated threshold that is less than the second designated threshold. When the operating parameter is less than the third designated threshold, the one or more processors are configured to operate the turbocharger assist device in the motor mode to exert torque on the turbocharger drive shaft to increase the rotational speed (or maintain the rotational speed) of the compressor. Optionally, the second load is the traction motor 308B, and the one or more processors are configured to open the switches 114B, 114C to block the conductive path between the second load and the battery module 106 and alternator 102, respectively, and to close the first switch 114A. The traction motor 308B generates electric current based on the rotation of the associated wheelset 302B and supplies the electric current to the turbocharger assist device via the secondary bus to power the turbocharger assist device in the motor mode. Therefore, at the lowest parameter range, such as when the vehicle 300 is moving at the lowest notch settings, the rotating wheelset connected to the second traction motor can be used to generate power for powering the turbocharger to support the compression of air into the engine.

Figure 5:
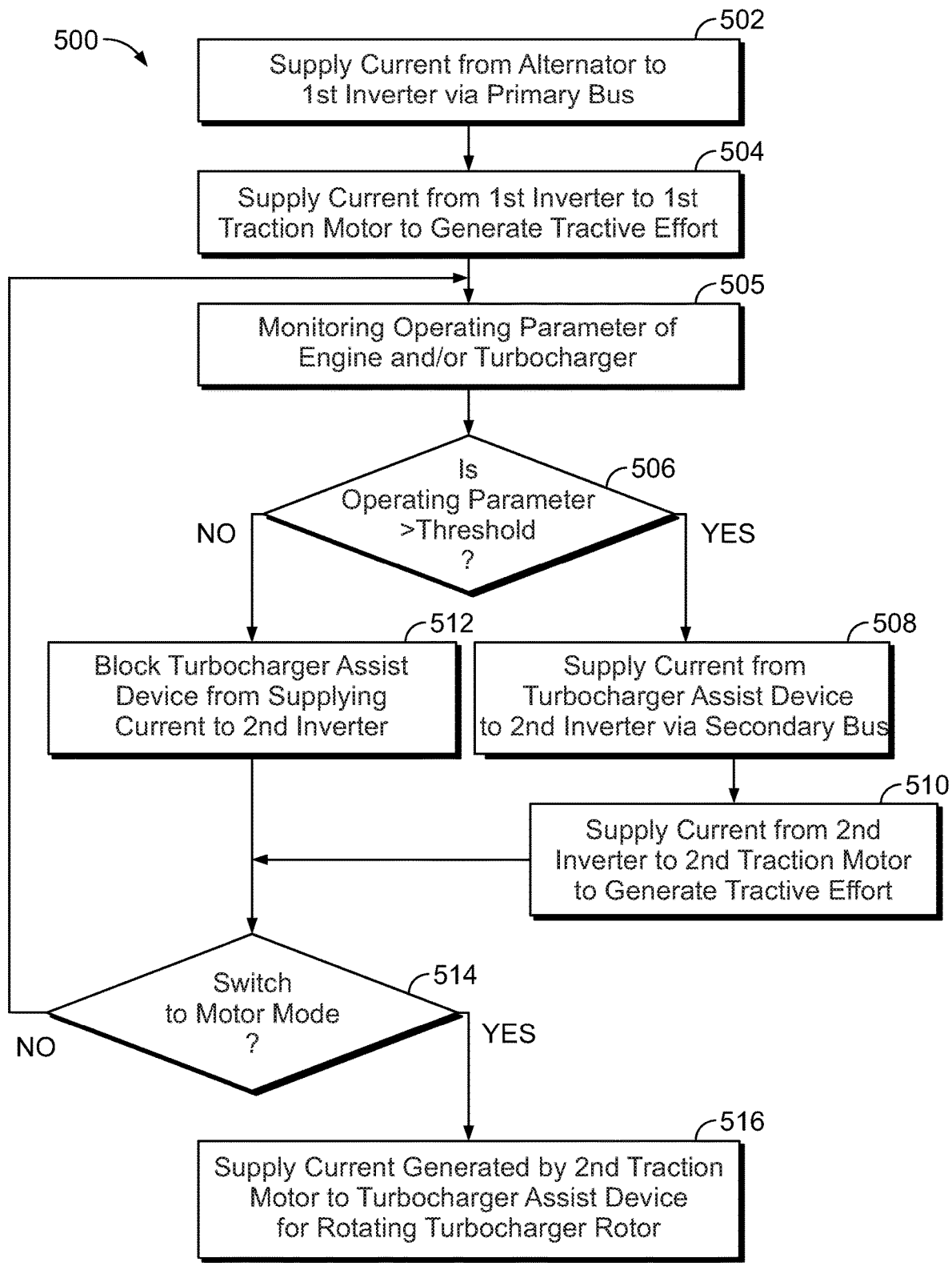
FIG. 5 is a flow chart of a method for delivering power from a turbocharged engine according to an embodiment.

FIG. 5 is a flow chart 500 of a method for delivering power from a turbocharged engine according to an embodiment. The method may be performed entirely or in part by the one or more processors 125 of the controller 108 shown in FIG. 2. Optionally, the method may include additional steps, fewer steps, and/or different steps than the illustrated flow chart. The method in the illustrated embodiment is performed on a vehicle propulsion system on a vehicle, but the method can also be performed on other types of turbocharged vehicles as well as non-vehicle applications, such as stationary industrial machinery.

The method begins at 502, at which electric current is supplied from an alternator to a first inverter via a primary bus of a power delivery system. The alternator generates the electric current based on mechanical energy received from an engine. At 504, the first inverter supplies the electric current to a first traction motor, which represents a first load. The first traction motor is controlled to generate tractive effort based on the received electric current. The tractive effort propels movement of the vehicle.

At 505, an operating parameter is monitored relating to one or more of the engine or the turbocharger. The turbocharger is operably coupled to the engine. The operating parameter may be monitored using sensors that are installed on or proximate to the engine and/or turbocharger. For example, the sensors may generate sensor signals including data representative of various operating parameters, and the sensor signals are communicated to the one or more processors. At 506, a determination is made whether an operating parameter is greater than a designated threshold. The designated threshold may be stored in an accessible database or hardwired into the logic of the one or more processors. The one or more processors may automatically make the determination based on the sensor signals received from one or more sensors.

If the operating parameter is greater than the designated threshold, the method continues to 508 and electric current is supplied from a turbocharger assist device to a second inverter via a secondary bus of the power delivery system. The turbocharger assist device operates in a generator mode to supply current to the secondary bus. The supply of current may be enabled by closing a switch to establish a conductive pathway from the turbocharger assist device to the second inverter via the secondary bus. At 510, the second inverter supplies the electric current to a second traction motor of the vehicle, which represents a second load. Alternatively, the second load may be an auxiliary load instead of a traction motor. The secondary bus is discrete from the primary bus. The turbocharger assist device is mechanically connected to the turbocharger. The turbocharger assist device is configured to generate electric current based on rotation of a rotor of the turbocharger. For example, the rotor rotation (e.g., the turbine and/or compressor) rotates a turbocharger drive shaft that is mechanically connected to the turbocharger assist device. The turbocharger assist device converts the mechanical rotation into electrical energy supplied as current to the secondary bus for powering the second traction motor. The second traction motor is controlled to generate tractive effort based on the received electric current to propel movement of the vehicle. Optionally, the first traction motor may be supplied electric current from the alternator via the primary bus concurrently with the second traction motor being supplied electric current from the turbocharger assist device via the secondary bus.

If, on the other hand, the operating parameter is determined to not be greater than the designated threshold, the method continues to 512. At 512, the turbocharger assist device is blocked from supplying current to the second inverter. Therefore, the second traction motor is not powered by the turbocharger assist device when the operating parameter is lower than the designated threshold. Optionally, the second traction motor may be powered by a battery module and/or the alternator at operating parameter ranges below the designated threshold.

At 514, a determination is made whether to switch from the generator mode of the turbocharger assist device to a motor mode. The determination may be based on the operating parameter that is monitored and/or other parameters, such as a speed of the vehicle, a grade of the route, a braking status of the vehicle, or the like. For example, designated threshold described in 506 may be a first designated threshold, and the mode may switch if the operating parameter is below a second designated threshold that is lower than the first designated threshold. If it is determined to switch to motor mode, the method continues to 516. At 516, the second traction motor generates electric current which is supplied from the second inverter via the secondary bus to the turbocharger assist device. The turbocharger assist device converts the electric current into mechanical energy for rotating the rotor of the turbocharger. In the motor mode, the turbocharger assist device supports the compression of air that is supplied to the engine by exerting a torque on the compressor rotor.

In one or more embodiments, a power delivery system includes a first inverter, a second inverter, and a turbocharger assist device. The first inverter is electrically connected to a primary bus and configured to receive electric current from an alternator via the primary bus to supply the electric current to a first load. The alternator generates the electric current based on mechanical energy received from an engine. The second inverter is electrically connected to a secondary bus that is discrete from the primary bus. The turbocharger assist device is mechanically connected to a turbocharger operably coupled to the engine. The turbocharger assist device is electrically connected to the secondary bus and configured to generate electric current based on rotation of a rotor of the turbocharger. The second inverter is configured to receive the electric current generated by the turbocharger assist device via the secondary bus to supply the electric current to a second load.

Optionally, the first inverter is one of a set of multiple inverters electrically connected to the primary bus, and the inverters in the set are electrically isolated from the second inverter.

Optionally, the first and second inverters are disposed onboard a vehicle and the first and second loads are first and second traction motors, respectively, for propelling the vehicle.

Optionally, the vehicle has multiple wheelsets. Each wheelset includes at least two wheels. The first traction motor is mechanically connected to a first wheelset of the multiple wheelsets and the second traction motor is mechanically connected to a second wheelset of the multiple wheelsets such that rotation of the rotor of the turbocharger is utilized for rotating the second wheelset to propel the vehicle.

Optionally, the turbocharger assist device is configured to generate electric current based on the rotation of the rotor of the turbocharger for powering the second traction motor in a generator mode. In a motor mode, the turbocharger assist device is configured to receive electric current from the second traction motor via the secondary bus and convert the electric current into mechanical energy for rotating the rotor of the turbocharger.

Optionally, the first inverter is configured to receive electric current from the alternator via the primary bus concurrently with the second inverter receiving electric current from the turbocharger assist device via the secondary bus.

Optionally, the turbocharger assist device is electrically connected to the secondary bus via a switch. The power delivery system further includes one or more processors operably connected to the switch and configured to monitor an operating parameter of the engine and/or the turbocharger. The one or more processors are configured to close the first switch to allow the turbocharger assist device to supply electric current to the second inverter via the secondary bus responsive to the operating parameter being greater than a designated threshold.

Optionally, the turbocharger assist device is electrically connected to the secondary bus via a switch. The power delivery system further includes one or more processors operably connected to the switch and configured to monitor an operating parameter of the engine and/or the turbocharger. The one or more processors are configured to open the first switch to block the turbocharger assist device from supplying electric current to the second inverter via the secondary bus responsive to the operating parameter being below a designated threshold.

Optionally, the turbocharger assist device is electrically connected to the secondary bus via a first switch. The power delivery system further includes a battery module electrically connected to the secondary bus via a second switch. The first switch is selectively closed to allow the turbocharger assist device to supply electric current to the second inverter, and the second switch is selectively closed to allow the battery module to supply electric current to the second inverter.

Optionally, the power delivery system further includes one or more processors operably coupled to the first and second switches and configured to monitor an operating parameter of the engine and/or the turbocharger. The one or more processors are configured to close the first switch to allow the turbocharger assist device to supply electric current to the second inverter responsive to the operating parameter being greater than a first designated threshold. The one or more processors are configured to close the second switch to allow the battery module to supply electric current to the second inverter responsive to the operating parameter being less than a second designated threshold that is less than the first designated threshold.

Optionally, the power delivery system further includes a three-phase diode rectifier disposed along the secondary bus between the turbocharger assist device and the second inverter.

Optionally, the turbocharger assist device is electrically connected to the secondary bus via a first switch and the alternator is electrically connected to the secondary bus via a second switch. The first switch is selectively closed to allow the turbocharger assist device to supply electric current to the second inverter. The second switch is selectively closed to allow the alternator to supply electric current to the second inverter.

Optionally, the power delivery system further includes one or more processors operably coupled to the first and second switches and configured to monitor an operating parameter of the engine and/or the turbocharger. The one or more processors are configured to close the first switch to allow the turbocharger assist device to supply electric current to the second inverter responsive to the operating parameter being greater than a first designated threshold. The one or more processors are configured to close the second switch to allow the alternator to supply electric current to the second inverter responsive to the operating parameter being less than a second designated threshold that is less than the first designated threshold.

In one or more embodiments, a method (e.g., for delivering power) includes supplying electric current from an alternator to a first inverter via a primary bus of a power delivery system for the first inverter to supply the electric current to a first load. The alternator generates the electric current based on mechanical energy received from an engine. The method also includes supplying electric current from a turbocharger assist device to a second inverter via a secondary bus of the power delivery system for the second inverter to supply the electric current to a second load. The secondary bus is discrete from the primary bus. The turbocharger assist device is mechanically connected to a turbocharger that is operably coupled to the engine. The turbocharger assist device is configured to generate electric current based on rotation of a rotor of the turbocharger.

Optionally, the electric current from the alternator to the first inverter via the primary bus is concurrently supplied with the electric current from the turbocharger assist device to the second inverter via the secondary bus.

Optionally, the first and second inverters are disposed onboard a vehicle and the first and second loads are first and second traction motors, respectively. The method also includes controlling the first and second traction motors to generate tractive effort to propel movement of the vehicle. The tractive effort is generated based on the electric current supplied from the alternator through the first inverter to the first traction motor and the electric current supplied from the turbocharger assist device through the second inverter to the second traction motor.

Optionally, the electric current is supplied from the turbocharger assist device to the second inverter for powering the second traction motor in a generator mode. The method further includes supplying, responsive to switching to a motor mode, electric current generated by the second traction motor from the second inverter to the turbocharger assist device via the secondary bus for the turbocharger assist device to convert the electric current into mechanical energy for rotating the rotor of the turbocharger.

Optionally, the method further includes monitoring, via one or more processors, an operating parameter of the engine and/or the turbocharger. The electric current is supplied from the turbocharger assist device to the second inverter for powering the second load responsive to the operating parameter being greater than a designated threshold.

Optionally, the method further includes monitoring, via one or more processors, an operating parameter of the engine and/or the turbocharger. The method also includes blocking the turbocharger assist device from supplying electric current to the second inverter via the secondary bus responsive to the operating parameter being below a designated threshold.

In one or more embodiments, a vehicle propulsion system includes an alternator, a turbocharger, a turbocharger assist device, first and second traction motors, a first inverter, and a second inverter. The alternator is configured to be disposed onboard a vehicle and to generate electric current based on mechanical energy received from an engine. The turbocharger is operably coupled to the engine. The turbocharger assist device is mechanically connected to the turbocharger and configured to generate electric current based on rotation of a rotor of the turbocharger. The first and second traction motors are mechanically connected to first and second wheelsets, respectively. Each of the first and second wheelsets includes at least two wheels. The first traction motor is electrically isolated from the second traction motor. The first inverter is electrically connected to the first traction motor and to the alternator via a primary bus. The first inverter is configured to receive the electric current generated by the alternator to power the first traction motor to rotate the wheels of the first wheelset for propelling movement of the vehicle. The second inverter is electrically connected to the second traction motor and to the turbocharger assist device via a secondary bus. The second inverter is configured to receive the electric current generated by the turbocharger assist device to power the second traction motor to rotate the wheels of the second wheelset for propelling the movement of the vehicle.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are within the scope of the claims if they have structural elements that do not differ from the literal language of the claims, or if they include equivalent structural elements with insubstantial differences from the literal languages of the claims.

The foregoing description of certain embodiments of the inventive subject matter will be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A power delivery system comprising:
a first inverter electrically connected to a primary bus and configured to receive electric current from an alternator via the primary bus to supply the electric current to a first load, the alternator generating the electric current based on mechanical energy received from an engine;
a second inverter electrically connected to a secondary bus that is discrete from the primary bus; and
a turbocharger assist device mechanically connected to a turbocharger operably coupled to the engine, the turbocharger assist device electrically connected to the secondary bus and configured to generate electric current based on rotation of a rotor of the turbocharger,
wherein the second inverter is configured to receive the electric current generated by the turbocharger assist device via the secondary bus to supply the electric current to a second load.

2. The power delivery system of claim 1, wherein the first inverter is one of a set of multiple inverters electrically connected to the primary bus, and the inverters in the set are electrically isolated from the second inverter.

3. The power delivery system of claim 1, wherein the first and second inverters are disposed onboard a vehicle and the first and second loads are first and second traction motors, respectively, for propelling the vehicle.

4. The power delivery system of claim 3, wherein the vehicle has multiple wheelsets, each wheelset including at least two wheels, wherein the first traction motor is mechanically connected to a first wheelset of the multiple wheelsets and the second traction motor is mechanically connected to a second wheelset of the multiple wheelsets such that rotation of the rotor of the turbocharger is utilized for rotating the second wheelset to propel the vehicle.

5. The power delivery system of claim 3, wherein the turbocharger assist device is configured to generate electric current based on the rotation of the rotor of the turbocharger for powering the second traction motor in a generator mode, and, in a motor mode, the turbocharger assist device is configured to receive electric current from the second traction motor via the secondary bus and convert the electric current into mechanical energy for rotating the rotor of the turbocharger.

6. The power delivery system of claim 1, wherein the first inverter is configured to receive electric current from the alternator via the primary bus concurrently with the second inverter receiving electric current from the turbocharger assist device via the secondary bus.

7. The power delivery system of claim 1, wherein the turbocharger assist device is electrically connected to the secondary bus via a switch, and the power delivery system further comprises one or more processors operably connected to the switch and configured to monitor an operating parameter of one or more of the engine or the turbocharger,
wherein the one or more processors are configured to close the first switch to allow the turbocharger assist device to supply electric current to the second inverter via the secondary bus responsive to the operating parameter being greater than a designated threshold.

8. The power delivery system of claim 1, wherein the turbocharger assist device is electrically connected to the secondary bus via a switch, and the power delivery system further comprises one or more processors operably connected to the switch and configured to monitor an operating parameter of one or more of the engine or the turbocharger,
wherein the one or more processors are configured to open the first switch to block the turbocharger assist device from supplying electric current to the second inverter via the secondary bus responsive to the operating parameter being below a designated threshold.

9. The power delivery system of claim 1, wherein the turbocharger assist device is electrically connected to the secondary bus via a first switch, and the power delivery system further comprises:
a battery module electrically connected to the secondary bus via a second switch, wherein the first switch is selectively closed to allow the turbocharger assist device to supply electric current to the second inverter and the second switch is selectively closed to allow the battery module to supply electric current to the second inverter.

10. The power delivery system of claim 9, further comprising one or more processors operably coupled to the first and second switches and configured to monitor an operating parameter of one or more of the engine or the turbocharger,
wherein the one or more processors are configured to close the first switch to allow the turbocharger assist device to supply electric current to the second inverter responsive to the operating parameter being greater than a first designated threshold, and
wherein the one or more processors are configured to close the second switch to allow the battery module to supply electric current to the second inverter responsive to the operating parameter being less than a second designated threshold that is less than the first designated threshold.

11. The power delivery system of claim 1, further comprising a three-phase diode rectifier disposed along the secondary bus between the turbocharger assist device and the second inverter.

12. The power delivery system of claim 1, wherein the turbocharger assist device is electrically connected to the secondary bus via a first switch and the alternator is electrically connected to the secondary bus via a second switch, wherein the first switch is selectively closed to allow the turbocharger assist device to supply electric current to the second inverter, and the second switch is selectively closed to allow the alternator to supply electric current to the second inverter.

13. The power delivery system of claim 12, further comprising one or more processors operably coupled to the first and second switches and configured to monitor an operating parameter of one or more of the engine or the turbocharger,
 wherein the one or more processors are configured to close the first switch to allow the turbocharger assist device to supply electric current to the second inverter responsive to the operating parameter being greater than a first designated threshold, and
 wherein the one or more processors are configured to close the second switch to allow the alternator to supply electric current to the second inverter responsive to the operating parameter being less than a second designated threshold that is less than the first designated threshold.

14. A method comprising:
 supplying electric current from an alternator to a first inverter via a primary bus of a power delivery system for the first inverter to supply the electric current to a first load, the alternator generating the electric current based on mechanical energy received from an engine; and
 supplying electric current from a turbocharger assist device to a second inverter via a secondary bus of the power delivery system for the second inverter to supply the electric current to a second load, the secondary bus being discrete from the primary bus, the turbocharger assist device mechanically connected to a turbocharger that is operably coupled to the engine, the turbocharger assist device configured to generate electric current based on rotation of a rotor of the turbocharger.

15. The method of claim 14, wherein the electric current from the alternator to the first inverter via the primary bus is concurrently supplied with the electric current from the turbocharger assist device to the second inverter via the secondary bus.

16. The method of claim 14, wherein the first and second inverters are disposed onboard a vehicle and the first and second loads are first and second traction motors, respectively, the method further comprising:
 controlling the first and second traction motors to generate tractive effort to propel movement of the vehicle, the tractive effort generated based on the electric current supplied from the alternator through the first inverter to the first traction motor and the electric current supplied from the turbocharger assist device through the second inverter to the second traction motor.

17. The method of claim 16, wherein the electric current is supplied from the turbocharger assist device to the second inverter for powering the second traction motor in a generator mode, and the method further comprises:
 supplying, responsive to switching to a motor mode, electric current generated by the second traction motor from the second inverter to the turbocharger assist device via the secondary bus for the turbocharger assist device to convert the electric current into mechanical energy for rotating the rotor of the turbocharger.

18. The method of claim 14, further comprising monitoring, via one or more processors, an operating parameter of one or more of the engine or the turbocharger, and wherein the electric current is supplied from the turbocharger assist device to the second inverter for powering the second load responsive to the operating parameter being greater than a designated threshold.

19. The method of claim 14, further comprising monitoring, via one or more processors, an operating parameter of one or more of the engine or the turbocharger, and
 blocking the turbocharger assist device from supplying electric current to the second inverter via the secondary bus responsive to the operating parameter being below a designated threshold.

20. A vehicle propulsion system comprising:
 an alternator configured to be disposed onboard a vehicle and to generate electric current based on mechanical energy received from an engine;
 a turbocharger operably coupled to the engine;
 a turbocharger assist device mechanically connected to the turbocharger and configured to generate electric current based on rotation of a rotor of the turbocharger;
 first and second traction motors mechanically connected to first and second wheelsets, respectively, each of the first and second wheelsets including at least two wheels, the first traction motor electrically isolated from the second traction motor;
 a first inverter electrically connected to the first traction motor and to the alternator via a primary bus, the first inverter configured to receive the electric current generated by the alternator to power the first traction motor to rotate the wheels of the first wheelset for propelling movement of the vehicle; and
 a second inverter electrically connected to the second traction motor and to the turbocharger assist device via a secondary bus, the second inverter configured to receive the electric current generated by the turbocharger assist device to power the second traction motor to rotate the wheels of the second wheelset for propelling the movement of the vehicle.

* * * * *